Figure 1:
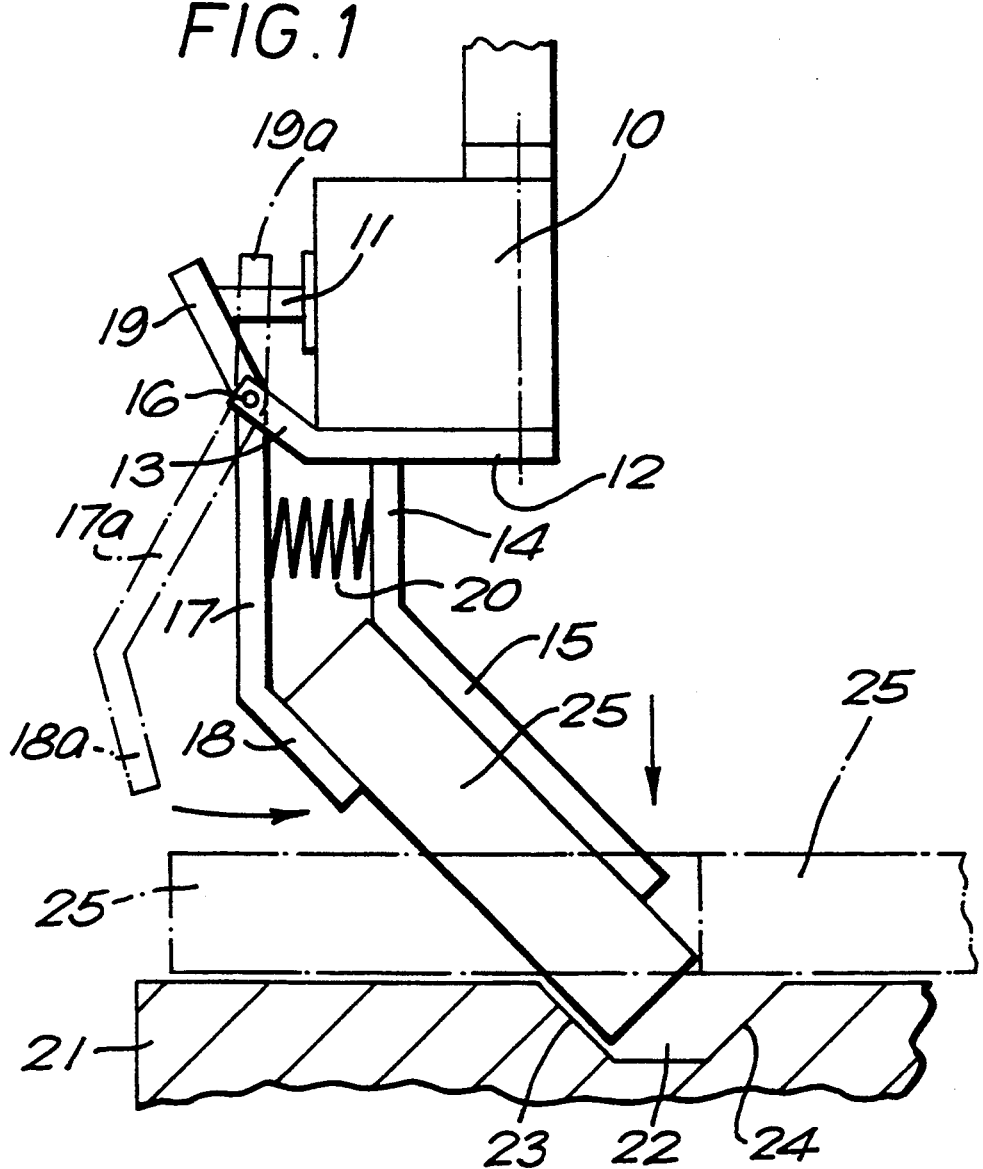

United States Patent [19]
Wadell

[11] Patent Number: 5,348,134
[45] Date of Patent: Sep. 20, 1994

[54] GRIPPING DEVICE

[75] Inventor: Lars G. A. Wadell, Aengelholm, Sweden

[73] Assignee: Nestec S.A., Vevey, Switzerland

[21] Appl. No.: 146,954

[22] Filed: Nov. 3, 1993

[30] Foreign Application Priority Data

Dec. 1, 1992 [EP] European Pat. Off. ......... 92120460.8

[51] Int. Cl.$^5$ .............................................. B65G 47/22
[52] U.S. Cl. .................... 198/409; 198/468.6; 198/468.8
[58] Field of Search ....................... 198/406, 409, 468.2, 198/468.6, 468.8, 470.1, 506, 803.3; 294/103.1

[56] References Cited

U.S. PATENT DOCUMENTS

| | | | |
|---|---|---|---|
| 3,882,991 | 5/1975 | Chayka et al. | 198/468.8 X |
| 3,985,223 | 10/1976 | Forcella et al. | 198/406 |
| 4,968,081 | 11/1990 | Beight et al. | 198/470.1 X |
| 5,172,802 | 12/1992 | Wells | 198/470.1 |
| 5,178,262 | 1/1993 | Merkli et al. | 198/470.1 X |

*Primary Examiner*—James R. Bidwell
*Attorney, Agent, or Firm*—Vogt & O'Donnell

[57] ABSTRACT

A gripping device and process comprising:
first and second matable jaw members;
a cylinder adapted to reciprocate vertically;
connecting the first jaw member to the cylinder such that, in operation, the cylinder and connection urge the first jaw member to open and close the jaws;
maintaining the second jaw member in a fixed position relative to the cylinder;
a fixed table positioned beneath the jaw members, provided with at least one transverse groove;
transporting a product downstream on the fixed table to locate it with its upstream or downstream edge overlying the transverse groove;
advancing the cylinder downwardly with the jaws in the open position to enable the lower end of the second jaw member to contact the product at its upstream or downstream end above the groove causing the product to tilt in the groove;
activating the cylinder to close the jaws to grip the tilted product at its upper end;
retracting the cylinder upwardly with the closed jaws gripping the product; and
deactivating the cylinder to open the jaws to release the product.

10 Claims, 2 Drawing Sheets

GRIPPING DEVICE

The present invention relates to a gripping device, more particularly for picking up frozen food products and releasing them.

Existing picking units comprising vacuum suction cups are not fully reliable for picking up products with an uneven or grooved surface nor for products which can let air through owing to the presence of slits or holes therein. In addition, rapid movements transverse to the suction force cause a hazard.

We have now invented a gripping device which avoids the above-mentioned difficulties.

Accordingly, the present invention provides a gripping device comprising:
 first and second matable jaw members;
 a cylinder adapted to reciprocate vertically;
 means connecting the first jaw member to the cylinder such that, in operation, the cylinder and connecting means urge the first jaw member to open and close the jaws;
 means for maintaining the second jaw member in a fixed position relative to the cylinder;
 a fixed table positioned beneath the jaw members, provided with at least one transverse groove;
 means for transporting a product downstream on the fixed table to locate it with its upstream or downstream edge overlying the transverse groove;
 means for advancing the cylinder downwardly with the jaws in the open position to enable the lower end of the second jaw member to contact the product at its upstream or downstream end above the groove causing the product to tilt in the groove;
 means for activating the cylinder to close the jaws to grip the tilted product at its upper end;
 means for retracting the cylinder upwardly with the closed jaws gripping the product; and
 means for deactivating the cylinder to open the jaws to release the product.

The means connecting the first jaw member to the cylinder may be a pivot positioned between the ends of the first jaw member so that the part of the first jaw member above the pivot is impelled by the cylinder piston.

The means for maintaining the second jaw member in the fixed position relative to the cylinder may be any suitable conventional fixing means and conveniently includes a plate connected to the cylinder.

The fixed table positioned beneath the jaw members is preferably provided with a plurality of consecutive spaced transverse grooves. Desirably the grooves are spaced from one another by a distance corresponding substantially to the length of each product so that the upstream and downstream edges of successive products transported on the table overlie the grooves.

The means for reciprocating the cylinder may be, for example, an electric motor or a pneumatic cylinder. Advantageously, there are a plurality of cylinders. The means for activating and deactivating the cylinder to close and open the jaws may conveniently be a pneumatic valve. Advantageously, the second jaw member is connected to the first jaw member below the pivot by a spring.

The transverse grooves are preferably provided with upstream and downstream planar walls the inside surfaces of which are at an acute angle to the surface of the table e.g. from 20° to 70° and especially from 30° to 60°.

This enables the part of the tilted product in the groove to rest firmly against the surface of a wall of the groove.

Advantageously, the gripping parts of the jaw members are positioned at an angle suitable for gripping the tilted product in the transverse groove.

Conveniently, the cylinder is also adapted to reciprocate horizontally from an upwardly retracted position above the table with the closed jaws gripping the products to a position above a means for receiving the product, at which position the jaws open to release the product onto the receiving means, and then back to the upwardly retracted position above the table.

The present invention also provides a process for gripping a product comprising positioning a device having:
 first and second matable jaw members;
 a cylinder adapted to reciprocate vertically;
 means connecting the first Jaw member to the cylinder such that, in operation, the cylinder and connecting means urge the first jaw member to open and close the jaws;
 means for maintaining the second jaw member in a fixed position relative to the cylinder; and
 means for activating and deactivating the cylinder for closing and opening the jaws above a fixed table provided with at least one transverse groove;
 transporting a product on the fixed table to locate it beneath the jaw members with its upstream or downstream edge overlying the transverse groove;
 advancing the cylinder downwardly with the jaws in the open position to enable the lower end of the second jaw member to contact the product at its upstream or downstream end above the groove causing the product to tilt in the groove;
 activating the cylinder to close the jaws to grip the tilted product at its upper end;
 retracting the cylinder upwardly with the closed jaws gripping the product; and
 deactivating the cylinder to open the jaws to release the product from the jaws.

The gripping device of the present invention is especially suitable for gripping resilient food products, such as frozen sawn fish pieces formed from a frozen fish block which has travelled beneath a saw. One advantage of the device of the present invention when gripping frozen sawn fish pieces is that the adjoining individual sawn pieces, which are often stuck together, can be broken apart by the action of the second jaw member contacting the end of the fish piece and pushing that end into a transverse groove.

The means for receiving the product may be, for instance, a pickup or distribution conveyor for transporting the product to a packing machine e.g. directly to the pockets of a Multivac machine.

Figure 2:
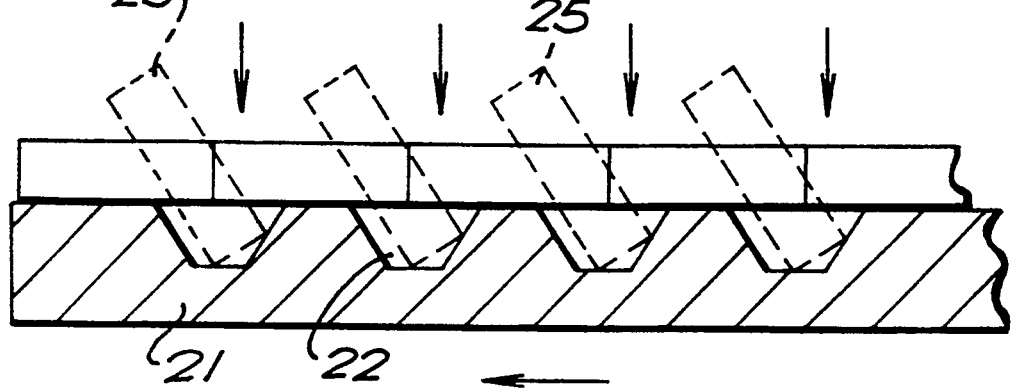
Figure 3:
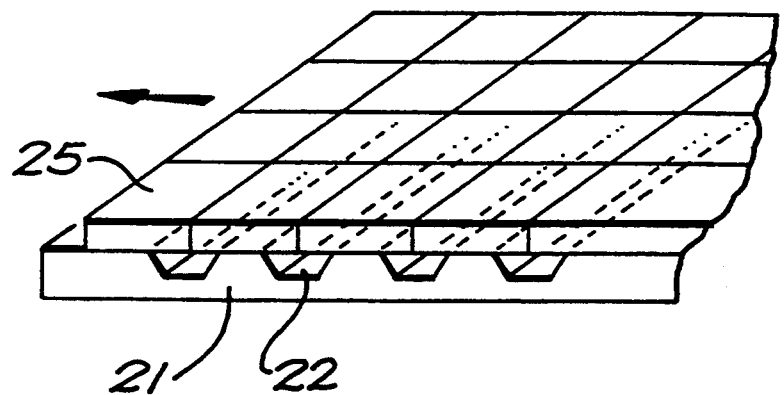
Figure 4:
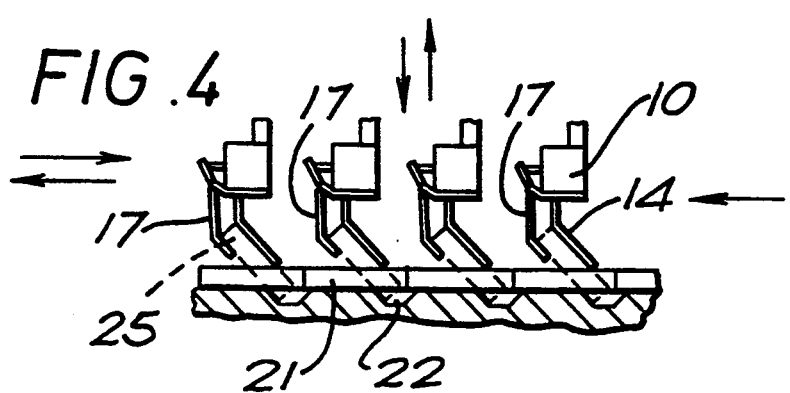
Figure 5:
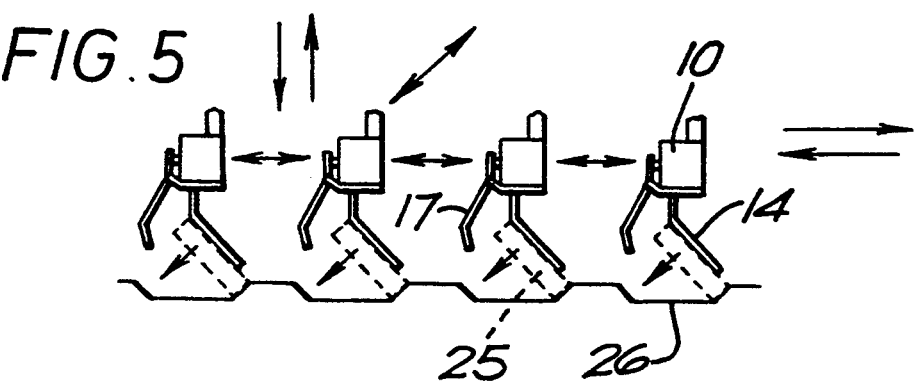

The present invention will now be further illustrated by way of example only with reference to the accompanying drawings in which FIG. 1 represents a diagrammatic side view of a gripping device of the present invention, FIG. 2 represents a side view of a grooved table carrying tilted frozen fish pieces, FIG. 3 represents a perspective view of a grooved table carrying sawn frozen fish pieces, FIG. 4 represents a side view of the device showing four tilted fish pieces being gripped by closed jaws, and FIG. 5 represents a side view of the device showing four tilted fish pieces being released from open jaws onto a conveyor belt.

Referring to the drawings, a pneumatic mini-cylinder 10 adapted to reciprocate vertically and horizontally is provided with a piston 11 and a plate 12 with an extending arm 13. Connected to the plate 12 is a fixed jaw member 14 with a gripping portion 15 and connected to the extending arm 13 by means of a pivot 16 is a jaw member 17, 17a with a gripping portion 18, 18a, and an upper portion 19, 19a, contacting the piston 11. (17a, 18a and 19a depict the open jaw position by the broken lines in FIG. 1).

The jaws are connected by extension spring 20. A fixed table 21 is provided with transverse grooves 22 positioned beneath the gripping portion 15 of the fixed jaw member 14 having an angled downstream wall 23 and an upstream wall 24. Sawn frozen fish pieces 25 travel on the table 21. A conveyor 26 leading to a Multivac packing machine is shown in FIG. 5.

In operation, fish blocks (not shown) are sawn into fish pieces 25 which travel to the left in the drawings on the grooved table 21 until the upstream and downstream edges of the fish pieces 25 are positioned to overlie the transverse grooves 22 on the table 21. As the leading fish piece 25 passes beneath the jaw members 14, 17, the cylinder 10 is in the raised position and the jaw members are in the open position as depicted by the broken lines 17a, 18a, 19a in FIG. 1 and the piston 11 is in the retracted position.

The cylinder 10 descends together with the jaw members 14, 17 and the lower end of the gripping portion 15 of the fixed jaw 14 contacts the upstream end of the fish piece 25 and pushes it downwards into the transverse groove 22 causing the fish piece to tilt at an angle equivalent to that of the downstream wall 23 while it is held in that position by the gripping portion 15. A pneumatic valve (not shown) activates the piston 11 to urge the upper part 19a of the jaw member 17a so that it pivots about the pivot 16 so that the gripping portion moves from position 18a to position 18 causing the jaws to close so that the tilted fish piece 25 is gripped by the gripping portions 15, 18.

The cylinder 10 ascends together with the closed jaws gripping the tilted fish piece 25 and then travels horizontally to a position above the conveyor 26 whereupon the piston 11 retracts causing jaw member 17 to open by pivoting about the pivot 16 and to release the fish piece on to the conveyor 26. The cylinder 10 with the jaws open then returns horizontally to a position above the table 21 whereupon the process is repeated.

The vertical and horizontally reciprocating movements of the cylinder may be controlled by an electric motor or a pneumatic cylinder and the whole operation may be synchronised by a computer.

I claim:

1. A gripping device comprising:
    first and second matable jaw members;
    a cylinder adapted to reciprocate vertically;
    means connecting the first jaw member to the cylinder such that, in operation, the cylinder and connecting means urge the first jaw member to open and close the jaws;
    means for maintaining the second jaw member in a fixed position relative to the cylinder;
    a fixed table positioned beneath the jaw members, provided with at least one transverse groove;
    means for transporting a product downstream on the fixed table to locate it with its upstream or downstream edge overlying the transverse groove;
    means for advancing the cylinder downwardly with the jaws in the open position to enable the lower end of the second jaw member to contact the product at its upstream or downstream end above the groove causing the product to tilt in the groove;
    means for activating the cylinder to close the jaws to grip the tilted product at its upper end;
    means for retracting the cylinder upwardly with the closed jaws gripping the product; and
    means for deactivating the cylinder to open the jaws to release the product.

2. A device according to claim 1 wherein the means connecting the first Jaw member to the cylinder is a pivot positioned between the ends of the first jaw member.

3. A device according to claim 1 wherein the means for maintaining the second jaw member in the fixed position relative to the cylinder includes a plate connected to the cylinder.

4. A device according to claim 1 wherein the means for activating and deactivating the cylinder to close and open the jaws is a pneumatic valve.

5. A device according to claim 2 wherein the second jaw member is connected to the first jaw member below the pivot by a spring.

6. A device according to claim 1 wherein the fixed table positioned beneath the jaw members is provided with a plurality of consecutive transverse grooves spaced from one another by a distance corresponding substantially to the length of each product.

7. A device according to claim 1 wherein the transverse grooves are provided with upstream and downstream planar walls the inside surfaces of which are at an acute angle to the surface of the table.

8. A device according to claim 1 wherein the gripping parts of the Jaw members are positioned at an angle suitable for gripping the tilted product in a transverse groove.

9. A device according to claim 1 wherein the cylinder is also adapted to reciprocate horizontally from an upwardly retracted position above the table with the closed jaws gripping the product to a position above a means for receiving the product, at which position the jaws open to release the product onto the receiving means, and then back to the upwardly retracted position above the table.

10. A process for gripping a product comprising positioning a device having:
    first and second matable jaw members;
    a cylinder adapted to reciprocate vertically;
    means connecting the first jaw member to the cylinder such that, in operation, the cylinder and connecting means urge the first jaw member to open and close the jaws;
    means for maintaining the second jaw member in a fixed position relative to the cylinder; and
    means for activating and deactivating the cylinder for closing and opening the jaws above a fixed table provided with at least one transverse groove; transporting a product on the fixed table to locate it beneath the jaw members with its upstream or downstream edge overlying the transverse groove;
    advancing the cylinder downwardly with the jaws in the open position to enable the lower end of the second jaw member to contact the product at its upstream or downstream end above the groove causing the product to tilt in the groove;
    activating the cylinder to close the jaws to grip the tilted product at its upper end;
    retracting the cylinder upwardly with the closed jaws gripping the product; and
    deactivating the cylinder to open the jaws to release the product from the jaws.

* * * * *